[11] 3,557,873

[72] Inventor William D. Owens
 South Pasadena, Calif.
[21] Appl. No. 748,181
[22] Filed July 29, 1968
[45] Patented Jan. 26, 1971
[73] Assignee Union Oil Company of California
 Los Angeles, Calif.
 a corporation of California

[54] METHOD FOR IMPROVING THE INJECTIVITY OF WATER INJECTION WELLS
 14 Claims, No Drawings
[52] U.S. Cl. ................................................ 166/274
[51] Int. Cl. ................................................ E21b 43/22
[50] Field of Search ................................... 166/273–275

[56] References Cited
 UNITED STATES PATENTS
 3,467,188  9/1969  Gogarty ..................... 166/274
 3,254,714  6/1966  Gogarty et al. ............ (166/274UX)
 3,275,075  9/1966  Gogarty et al. ............ 166/274
 3,303,878  2/1967  Connally .................... 166/274X
 3,343,597  9/1967  Gogarty et al. ............ 166/273
 3,356,138  12/1967 Davis et al. ................ 166/274
 3,376,925  4/1968  Coppel ....................... 166/274

*Primary Examiner*—Marvin A. Champion
*Assistant Examiner*—Ian A. Calvert
*Attorneys*—Milton W. Lee, Richard C. Hartman, Lannas S. Henderson, Dean Sandford and Robert E. Strauss

ABSTRACT: The injection rate of water into water injection wells that exhibit low injectivity because of oil saturation in the formation adjacent to the well can be increased by introducing a small quantity of soluble oil into the well, and thereafter displacing the soluble oil into the formation with subsequently injected flood water. This treatment removes almost all of the oil from the formation adjacent to the well, thereby increasing the relative permeability of the formation to water.

3,557,873

METHOD FOR IMPROVING THE INJECTIVITY OF WATER INJECTION WELLS

This invention relates to the recovery of oil from subterranean reservoirs by a waterflood process. More specifically, this invention relates to improving the injection rate of water into input wells in a waterflood process.

It has long been recognized that substantial amounts of oil remain unrecovered at the completion of normal primary recovery operations. In order to improve the recovery of oil, it is common practice to supplement the native reservoir energy by various means including the use of water to displace oil from a formation, which process is conventionally called waterflooding. A waterflood process, briefly, comprises introducing water into a formation through at least one input well, forcing the water through the formation toward at least one output well, and recovering through the output well the oil that is displaced from the formation by the water.

One of the principal problems encountered in waterflooding is the economical injection of a sufficient quantity of water to carry out the process. Reduced water injectivity can be caused by the presence of oil in the formation around the input well. A condition of oil saturation in porous rock material substantially reduces the effective permeability of the rock to the flow of water, necessitating increased injection pressures to force the water into the formation. The higher pressure not only increases the cost of injecting water, but in many fields the injection rates are limited because of pressure limitations of the well casings or because the fracturing pressure of the formation cannot be exceeded.

It has heretofore been proposed to increase the permeability of the formation around the well to water by reducing the oil saturation of the formation. Specifically, it has been proposed that oil saturation be reduced by injecting solvents such as carbon dioxide, acetone, ethyl alcohol, isopropyl alcohol, n-propyl alcohol, alkyl alcohol, diacetone alcohol, butyl cellosolve, butyl carbitol, dioxane, liquid ammonia and alternate slugs of liquid hydrocarbon and liquid ammonia. While these solvents are more or less effective in reducing oil saturation in the formation, excessive quantities of solvent are required to completely remove the oil. Also, many of the suggested solvents are expensive. Hence, need exists for a simple, inexpensive method for treating a formation adjacent to the well bore to substantially completely remove oil therefrom.

Accordingly, a principal object of the present invention is to improve the water injectivity of an input well in a waterflooding process. Another object of the invention is to provide a process for reducing the oil saturation in that portion of an oil-bearing formation surrounding a water injection well. A still further object of this invention is to provide a simple, inexpensive method for substantially completely removing oil from the formation adjacent to a water injection well. Other objects and advantages of the invention will be apparent from the following description.

Briefly, this invention contemplates a process for improving the injectivity of water into a subterranean oil-bearing formation by removing the oil from that part of the formation immediately surrounding the well. Oil removal is accomplished by introducing a small amount of soluble oil into the well, and thereafter displacing the soluble oil outwardly from the well into the formation. The soluble oil can be introduced into the well in the form of a substantially anhydrous liquid or as a water-containing microemulsion, and then displaced from the well into the formation by subsequently injecting flood water.

Because of the radial flow system involved in injecting fluids from a well outwardly into a surrounding permeable formation, that portion of the formation immediately adjacent to the well is most critical with respect to restricting the rate of injection of fluid into the formation. Hence, the restriction on the flow of water from the well into the formation due to oil blockage can be substantially reduced by removing oil from only that portion of the formation immediately adjacent to the well. Oil blockage can be effectively minimized by removing oil from the strata of the formation into which water is to be injected to a distance of 5 to 10 feet from the well.

Oil can be removed from an oil-bearing formation by displacement with water down to a residual oil saturation of about 20 to 35 pore volume percent, but cannot be removed below the residual saturation by water displacement alone. Residual oil can be substantially completely removed from the formation adjacent to the well by placing a small amount of soluble oil in the well, and subsequently injecting flood water to displace the soluble oil outwardly into the formation. By the term "substantially completely removed," as used herein, it is meant that almost all of the residual oil is removed from the formation adjacent to the well. More specifically, it is preferred that the oil content of the formation adjacent to the well be reduced to less than about 5 percent of the pore volume, and more preferably, to less than about 2 percent. Because of the high solvency of the soluble oil for the connate oil, the formation adjacent to the well can be substantially denuded of oil by displacing only a small quantity of soluble oil therethrough. The soluble oil is introduced into the well and forced into the formation adjacent to the well in an amount less than about 1 barrel per foot of vertical formation thickness, and preferably in an amount between about 0.05 to 0.5 barrels per foot of vertical formation thickness.

The soluble oils used herein are oleaginous compositions which are miscible with the connate oil and have the ability to spontaneously emulsify with water when admixed therewith. These soluble oils comprise a liquid hydrocarbon, one or more selected surface active agents, and optionally, a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they contain color bodies. It is recognized, of course, that some cloudiness may appear at certain water concentrations without adversely effecting the utility of the microemulsion in removing oil from that portion of the formation which it contacts. Emulsions of this type are designated microemulsions to distinguish them from ordinary water-in-oil microemulsions in which the lower limit in the size of the water droplets is about 0.1 micron. At water concentrations above the inversion concentration, the emulsion inverts to an emulsion of the oil-in-water type in which droplets of oil are dispersed in a continuous water phase. In most soluble oil systems, the water concentrations employed in the practice of this invention are substantially below the inversion concentration.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semirefined petroleum product, such as gasoline, naphtha, stove oil and diesel; a residual product obtained by the distillation of lower boiling fractions from a crude oil, such as bunker fuel oil and other residual products; a low value refinery byproduct, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or nonpolar, groups in a surfactant material expressed by a numerical value designated HLB number. The spreading coefficient is an indication of the facility with which one liquid spreads upon another liquid. Spreading coefficients greater than 0 indicate that the first liquid well will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl monosulfonate or mixture of monosulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid, or sulfur trioxide, followed by neutralization to form the sulfonates. Upon sulfonation, two types of general products are formed which are designated mahogany acid and green acid. The terminology is based on the colors imparted to the respective oil and water phases produced in the sulfonation process, a brownish color being imparted to the oil phase by oil-soluble sulfonic acids and a greenish color being imparted to the aqueous phase by the water-soluble sulfonic acids. The mahogany acids and the green acids can be neutralized to form mahogany sulfonates and green sulfonates.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water-soluble agent. Although the optimum surfactant combination is dependent upon the characteristics of the particular reservoir, in many operations it is found the superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl ethers. Specific agents found particularly useful include isopropyl alcohol, secondary butyl alcohol, methyl ethyl ketone, glycol monoethyl ether, (cellosolve), glycol monobutyl ether (butyl cellosolve), and diethylene glycol monobutyl ether (butyl carbitol).

The soluble oil can be used in the form of a substantially anhydrous liquid, in which case it contains only small amounts of water present as impurities in the various components, or up to about 40 percent water can be added to the soluble oil to form the aforementioned microemulsions.

A preferred composition in accordance with this invention useful in removing oil from the formation comprises a mixture of about 45 to 75 percent liquid hydrocarbon, such as crude petroleum or other high boiling hydrocarbon; 8 to 30 percent of a surface active material, such as alkyl aryl monosulfonate obtained by sulfonation of an aromatic petroleum fraction; 3 to 8 percent stabilizer; and 0 to 40 percent water. Also, where the hydrocarbon liquid has a relatively high viscosity, light liquid hydrocarbon can be added to reduce the viscosity of the resulting soluble oil so that it can be more easily displaced into the formation. The light hydrocarbon will usually not constitute more than 25 volume percent of the resulting soluble oil.

The compositions useful in the practice of this invention can be prepared by any of the conventional techniques. One suitable method of preparing these compositions is to first admix the hydrocarbon base stock, surface active material and stabilizer in the desired proportions to form a substantially anhydrous soluble oil. Thereafter, if desired, water is added to obtain a microemulsion of the desired water content. Preferably, the water employed in forming the microemulsion is a salt-containing fresh water having a dissolved salt content of less than about 5,000 p.p.m.

In the practice of this invention, the soluble oil composition can be injected into the well either preceding a waterflood, or flood water injection can be interrupted and the soluble oil introduced into the well at any time during the waterflood that it is desired to increase flood water injectivity. In the usual practice of placing a well in water injection service, water injection is first initiated to establish injection profiles and rates. Thereafter, if necessary, water injection is discontinued and a quantity of soluble oil preferably amounting to not more than about 1 barrel per foot of vertical thickness of the zone to be waterflooded is introduced into the well. Water injection is then resumed to displace the soluble oil from the well outwardly into the formation. Where the water injection has been inhibited by oil blockage in the formation adjacent to the well, this step will be accompanied by an immediate reduction in injection pressure, or a corresponding increase in injection rate.

The invention is further described by the following examples which are illustrative of specific modes of practicing the invention and are not intended as limiting the scope of the invention as defined by the appended claims.

EXAMPLE 1

The improvement in water permeability obtainable by treating an oil-containing porous earth formation by the method of this invention is illustrated by the following laboratory test.

A porous Berea core 2 inches in diameter by 3 inches long that exhibits a permeability to brine of 346 md. in the absence of oil is saturated with crude oil and then flooded with brine to a residual oil saturation of about 29 percent. The brine contains 2.8 weight percent dissolved salts, i.e., 2.0 weight percent sodium chloride, 0.5 weight percent calcium chloride, and 0.3 weight percent magnesium chloride. The permeability of the core to brine is reduced to 41.8 md.

The core is treated in accordance with the method of this invention by injecting a slug of soluble oil and displacing the soluble oil through the core with brine. The soluble oil has the following composition:

| | | |
|---|---|---|
| Crude | do | 69.2 |
| Butyl cellosolve | do | 6.4 |
| Oil-soluble sulfonate | do | 14.7 |
| Water-soluble sulfonate | do | 5.7 |
| Fresh water | do | 4.0 |

After treatment of the core in this manner, its permeability to brine is 328 md.

EXAMPLE 2

The comparative oil removing ability of conventional solvents and soluble oils are determined by the following tests.

A number of Berea cores one foot long are saturated with brine (1.5 weight percent sodium chloride solution) and then with West Texas crude oil, the saturated cores containing about 62 volume percent crude oil. A slug of displacing agent is injected into one of the cores and thereafter displaced through the core by subsequently injected brine. The amount of oil recovered from the core is measured and the residual oil remaining in the core calculated. The test is repeated on other of the cores using different displacing agents, and the following results obtained:

| Displacing agent | Slug size, percent pore volume | Residual oil saturation after 2 pore volumes of brine injection, percent pore vol. |
|---|---|---|
| Tert-butyl alcohol | 45 | 13 |
| Isopropyl alcohol | 45 | 19 |
| Sec-butyl alcohol | 45 | 13 |
| Methyl ethyl ketone | 45 | 14 |
| Soluble oil A | 15 | 1 0 |
| Soluble oil B | 15 | 1 0 |

1. About 5 percent of the soluble oil remained unrecovered after the injection of 2 pore volumes of brine.

The soluble oils used in these tests have the following composition:

Soluble Oil A

| | Vol. percent |
|---|---|
| Illinois crude oil | 69.2 |
| Butyl cellosolve | 6.4 |
| Oil-soluble sulfonate | 11.7 |
| Water-soluble sulfonate | 8.7 |
| Water | 4.0 |

Soluble Oil B

| | Vol. percent |
|---|---|
| Motor base gasoline | 48.6 |
| Isopropyl alcohol | 6.1 |
| Oil-soluble sulfonate | 12.9 |
| Water | 32.4 |

It is apparent from these tests that substantially all of the residual oil in the porous core is removed by the injection of soluble oil, where substantial oil remains after the injection of more than three times the quantity of conventional displacement fluids.

EXAMPLE 3

The improvement in water injectivity obtainable by the method of this invention is illustrated by treatment of a water injection well employed in a commercial waterflooding operation. The injection well is completed in 9 feet of oil sands with conventional perforated casing. The well had formerly been in oil production service and was recently converted to water injection as part of a large scale flooding operation. The water injection rate stabilized at 36 barrels per day at a surface injection pressure of 825 p.s.i.g., which rate does not conform to the planned flooding pattern.

The injection well is treated in accordance with the method of this invention by interrupting the flood water injection, injecting 1 bar of substantially anhydrous soluble oil into the well, and thereafter continuing the injection of flood water. The soluble oil comprised a mixture of about 72 percent crude oil, 6.7 percent isopropyl alcohol and 21.3 percent of mixed alkyl aryl petroleum sulfonates. Within a short time after injection of the soluble oil, the water injection rate increased to 250 barrels per day at the same injection pressure.

Various embodiments and modifications of this invention have been described in the foregoing description and examples, and further modifications will be apparent to those skilled in the art. Such modifications are included within the scope of this invention as defined by the following claims.

I claim:

1. In the method of recovering oil from a subterranean reservoir wherein an aqueous liquid is injected through an injection well and oil is recovered from a spaced production well, and wherein the injection of said aqueous liquid is restricted by the presence of oil in the reservoir adjacent to the injection well, the improvement which comprises introducing a substantially anhydrous soluble oil into the injection well in an amount not greater than about 1 barrel per foot of vertical thickness of aid reservoir and thereafter resuming the injection of said aqueous liquid to displace said soluble oil into the reservoir.

2. The method defined in claim 1 wherein sufficient soluble oil is introduced into said reservoir to remove oil from said reservoir to a distance of up to 5 to 10 feet from said injection well.

3. The method defined in claim 1 wherein between about 0.05 to 0.5 barrels of soluble oil is injected into said reservoir per foot of vertical thickness of said reservoir.

4. The method defined in claim 1 wherein said soluble oil comprises hydrocarbon liquid, organic stabilizing agent, and surfactant.

5. The method defined in claim 1 wherein said soluble oil is a water-in-oil microemulsion comprised of hydrocarbon liquid, organic stabilizing agent, surfactant, and about 4 volume percent water.

6. In the injection of aqueous liquid through an injection well and into a porous subterranean formation containing oil which is resistant to displacement by said aqueous liquid, and which subsequently restricts the passage of said aqueous liquid through the formation, the improvement which comprises removing said oil from the formation immediately adjacent to said well by introducing a substantially anhydrous soluble oil into the formation adjacent to the well in an amount not greater than about 1 barrel per foot of vertical thickness of the formation, and thereafter injecting said aqueous liquid through said well and into said formation.

7. The method defined in claim 6 wherein sufficient soluble oil is introduced into said reservoir to remove oil from said formation to a distance of up to 5 to 10 feet from said injection well.

8. The method defined in claim 6 wherein between about 0.05 to 0.5 barrels of soluble oil is injected into said formation per foot of vertical thickness of said formation.

9. The method defined in claim 6 wherein said soluble oil comprises hydrocarbon liquid, an organic stabilizing agent, and a surfactant.

10. The method defined in claim 6 wherein said soluble oil is a water-in-oil microemulsion comprised of hydrocarbon liquid, organic stabilizing agent, surfactant, and about 4 volume percent water.

11. A method for improving the injectivity of water into a porous subterranean oil-bearing formation penetrated by a water injection well, which comprises:
    injecting water through said injection well and into said formation at a first injection rate;
    introducing a small volume of a substantially anhydrous soluble oil into the formation adjacent to the well in an amount sufficient to remove oil from said formation to a distance of up to 5 to 10 feet from said injection well; and
    thereafter injecting water through said injection well and into said formation at an injection rate higher than said first injection rate.

12. The method defined in claim 11 wherein said soluble oil is injected into the formation in an amount not greater than about 1 barrel per foot of vertical thickness of the formation.

13. The method defined in claim 11 wherein said soluble oil is a water-in-oil microemulsion comprised of hydrocarbon liquid, organic stabilizing agent, surfactant and about 4 volume percent water.

14. The method defined in claim 11 wherein said soluble oil comprises hydrocarbon liquid, organic stabilizing agent, and surfactant.